United States Patent
Blattner et al.

[11] Patent Number: 5,975,279
[45] Date of Patent: Nov. 2, 1999

[54] DEVICE FOR INDIVIDUALIZING AND FEEDING CARRIERS TO A HANGING CONVEYOR SYSTEM

[75] Inventors: Thomas Blattner, Bielefeld; Dirk Sieksmeier, Spenge; Paul Janzen, Bielefeld, all of Germany

[73] Assignee: Dürkopp Adler AG, Germany

[21] Appl. No.: 08/844,096

[22] Filed: Apr. 18, 1997

[30] Foreign Application Priority Data

Apr. 20, 1996 [DE] Germany .......................... 196 15 773

[51] Int. Cl.[6] .......................... B65G 47/28; B65G 33/30
[52] U.S. Cl. ................... 198/459.4; 198/465.4; 198/467.1; 198/661
[58] Field of Search ............ 198/459.4, 465.4, 198/467.1, 661

[56] References Cited

U.S. PATENT DOCUMENTS

| | | | |
|---|---|---|---|
| 2,752,883 | 6/1956 | Curtis | 198/465.4 |
| 4,995,531 | 2/1991 | Summers | 198/467.1 |
| 5,088,914 | 2/1992 | Brambilla | 425/208 |
| 5,269,402 | 12/1993 | Speckhart et al. | 198/465.4 |

FOREIGN PATENT DOCUMENTS

| | | | |
|---|---|---|---|
| 428820 | 5/1991 | European Pat. Off. | |
| 492465 | 7/1992 | European Pat. Off. | 198/465.4 |
| 4230995 | 3/1984 | Germany | |
| 4319164 | 3/1996 | Germany | |

*Primary Examiner*—William E. Terrell
*Assistant Examiner*—Mark Deuble
*Attorney, Agent, or Firm*—Ostrolenk, Faber, Gerb & Soffen, LLP

[57] ABSTRACT

A device for individualizing and feeding individual conveying carriers into a revolving hanging conveyor system. The individualizing device contains a rotatably driven spindle provided with grooves on the spindle's surface, wherein the pitch of each groove increases in the direction of conveyance. The feed device includes the individualizing device and a transfer conveyor, wherein the speed of conveyance of the transfer conveyor is adjustable.

9 Claims, 4 Drawing Sheets

DEVICE FOR INDIVIDUALIZING AND FEEDING CARRIERS TO A HANGING CONVEYOR SYSTEM

BACKGROUND OF THE INVENTION

The present invention relates to a method for controlling a hanging conveyor system having a revolving hanging conveyor which is equipped with a plurality of conveyor pockets arranged one behind the other, a feed device by which individual conveying carriers, Such as clothes hangers, are introduced at a transfer place into one conveyor pocket each, the feed device being provided with an individualizing device by which the conveying carriers to be introduced are spaced apart from each other, and a control device.

Such a method is known, for instance, from EP 0 517 677 B1. The hanging conveyor system serves to sort conveying carriers, such as articles of clothing hanging on clothes hangers. The conveying carriers are fed in random sequence to the endlessly revolving hanging conveyor system. For this purpose, one or more transfer places are provided at which a feed device is arranged. Each conveyor pocket is developed to receive a single conveying carrier. In order to make certain that in all cases only one conveying carrier is fed into a conveyor pocket, the feed device is provided with an individualizing device by which the individual conveying carriers, i.e. the hooks of the clothes hangers, are separated and spaced from each other. The individualizing device consists of an inclined rail along which the clothes hangers slide and of separating fingers which are arranged above the rail and can be moved in vertical direction. The hooks of the clothes hangers come against the separating fingers and are prevented thereby from sliding further. The presence of an article of hanging on a clothes hanger at the last separating finger is recognized by a sensor, thus avoiding having a further conveying carrier coming against this individualizing device before the device has been fed the preceding conveying carrier.

The capacity of such a hanging conveyor system is limited solely by the fact that in each case only one clothes hanger hook can be introduced into each conveyor pocket. An increase in capacity is possible only by increasing the speed of conveyance and/or reducing the distance between the individual conveyor pockets. However, there are limits on the speed of conveyance. The conveying carrier arrives at the transfer place only under the action of gravity after the separating fingers have released it. It follows from this that the time which passes from the moment of the release of the conveying carrier until its arrival at the transfer place depends on the weight of the conveying carrier and on the frictional conditions between the clothes hanger hook and slide rail.

clothes hangers with hooks of metal or plastic are used in the garment industry. The cross section of the clothes hanger hook also varies. For reasons of stability, a wire hanger can have a substantially smaller cross section than a plastic hanger. In particular, stores are supplied with articles of clothing from the entire world. There is no world-wide standard for clothes hangers. These stores are now confronted by the problem that it must be possible for every conceivable shape of hanger to be handled by them. For sorting, different articles of clothing, such as coats, clothes, trousers, or jackets, of different sizes are fed, hanging on different types of clothes hangers, to the hanging conveyor system. Since the articles of clothing on clothes hangers are introduced while still unsorted into the hanging conveyor system, the time which passes from the time they are individualized until they reach the transfer place differs for each conveying carrier. The conveyor pocket must therefore move sufficiently slowly past the transfer place in order to be certain that it also finds in front of it a conveying carrier which it can take over. On the one hand, an increase in the speed of conveyance beyond a certain amount entails the danger that individual conveyor pockets may not be loaded if a conveying carrier is not present at the transfer place. On the other hand, the danger that the conveying carriers, which are accelerated by the transferring into the conveying pocket, are shaken since they were previously resting at the transfer place. Upon being shaken, the articles of clothing hanging from the clothes hangers may drop off.

SUMMARY OF THE INVENTION

The present invention improves the method for controlling a hanging conveyor system in such a manner that an increase in the speed of feed and thus an increase in capacity is possible even if differently shaped conveying carriers are used.

In order to obtain this improvement, the method is characterized by the steps of:

determining from a given position in the hanging conveyor the time required for each conveyor pocket to reach the transfer place, and sharing this time in the control device;

using the individualizing device, placing the conveying carriers one after the other with a minimum space between each other onto a traveling transfer conveyor which is connected to the control device, defecting the transfer of each conveying carrier onto the transfer conveyor at a given place and storing the time of transfer in the control device;

calculating the time remaining from the time of transfer of each conveying carrier onto the transfer conveyor until arrival of a conveyor pocket at the transfer place is calculated in the control device; and adjusting the speed of conveyance of the transfer conveyor by the control device, such that in each case the conveying carrier detected is at the transfer place at the same time as a conveyor pocket.

By this method it is possible to synchronize the transfer conveyor and the (main) conveyor of the hanging conveyor system. Since it can be precisely calculated when a conveyor pocket will be at the transfer place, the individual conveying carriers are correspondingly accelerated or delayed on the transfer conveyor so as to arrive at the transfer place at the same time. There is no clocking upon the transfer, so that continuous introduction of the conveyor pockets into the hanging conveyor system, which revolves with constant speed, is possible. Even without an increase in the speed of conveyance, an increase in the capacity can be obtained. Furthermore, it is possible to accelerate the conveying carrier to a given speed upon the transfer so that shaking in the conveyor pocket is definitely avoided.

The minimum distance between the conveying carriers, which is produced by the individualizing device is, in principle, always obtained when conveying carriers of the same type are introduced one after the other into the hanging conveyor system. It is then necessary that sufficient time passes between the individual conveying carriers until the next conveyor pocket arrives at the transfer place in order to avoid congesting the transfer conveyor. If a distance greater than the minimum space is established between the individual conveying carriers, as is to be assumed when a small, light conveying carrier is followed by a larger heavy one, the transfer conveyor is slowed down upon transfer of the front conveying carrier into the conveyor pocket. If the distance to the next conveying carrier becomes less than the minimum space, then the transfer conveyor accelerates after the second conveying carrier has been introduced into the conveyor pocket.

The time required for the conveyor pocket to reach the transfer place is preferably determined from several different places in the hanging conveyor. In this way, the number of clock pulses becomes greater and thus the clocking smaller, so that the precision of the result of the measurement is increased.

In order to produce a clock pulse in the hanging conveyor system, regularly recurring points in the locating conveyor are detected. For this purpose, the individual endlessly assembled conveyor elements are, for instance, marked, so that they can be recognized by a light barrier or the like. The smaller the distance between the regularly recurring points to be detected, the more precise the time determination.

By the regular clock pulse produced in the hanging conveyor system itself, the length of a conveyor path can be defined by a given number of clock pulses. The number is dependent in this connection on the distance between the individual revolving fixed points detected at the measurement place.

In the individualizing device there is preferably used a spindle with deep-cut threads of the same pitch which is driven by an easily controlled motor. However, it is also possible to use a conveyor such as the one described in Federal Republic of Germany 43 19 164 C2.

The minimum distance between the conveying carriers can be adjusted in a particularly effective manner by the use of a rotatably driven spindle, the pitch of which increases in the direction of conveyance, the spindle being divided into several regions of different pitch and at least two different pitches being provided in each region, the first pitch in each region, referred to the direction of conveyance, being smaller than the last pitch in the preceding region.

The smaller pitch in each region is preferably present over at least two full revolutions.

In order that conveying carriers having a different cross section of the hook can be dependably separated, the width of the groove in the spindle preferably increases in direction of conveyance.

By this development of the individualizing device, hanger hooks of large cross section are conveyed rapidly forward since they cannot engage into the narrower grooves, but are transported forward directly, supported by the oblique position of the individualizing device, until they are grasped by the groove suitable for them, and are then rapidly fed forward via the large pitch of the spindle, while the following smaller hanger hooks pass through each groove. The last pitch determines the minimum distance which is established between two hangers. If a conveying carrier having a hook of small cross section is followed by a conveying carrier having a hook of large cross section, the latter cannot pass the front hanger. Accordingly, it is conveyed with the same speed as the first conveying carrier which must pass through each groove. At the end of the individualizing device, accordingly, the minimum distance apart is established. On the other hand, if a conveying carrier having a larger cross section of hook is followed by a conveying carrier having a smaller cross section of hook, then the first is transported rapidly forwards, while the smaller one requires a longer period of time. A substantially greater distance than the minimum distance is established between the conveying carriers, which are then individualized.

Federal Republic of Germany 44 01 232 A1 describes an individualizing and positioning device in which a rotatably mounted spindle is used which can be positioned at a correct angle via a sensor device, a control device, and a drive with defined control. This individualizing device is used in the transport system of a textile machine with revolving individual spool carriers. The spindle has a thread of increasing pitch in the direction of conveyance.

Other features and advantages of the present invention will become apparent from the following description of the invention which refers to the accompanying drawings.

BRIEF DESCRIPTION OF THE DRAWINGS

One embodiment of the invention will be explained in further detail below with reference to the drawing, in which.

DETAILED DESCRIPTION OF AN EMBODIMENT OF THE INVENTION

Figure 1:
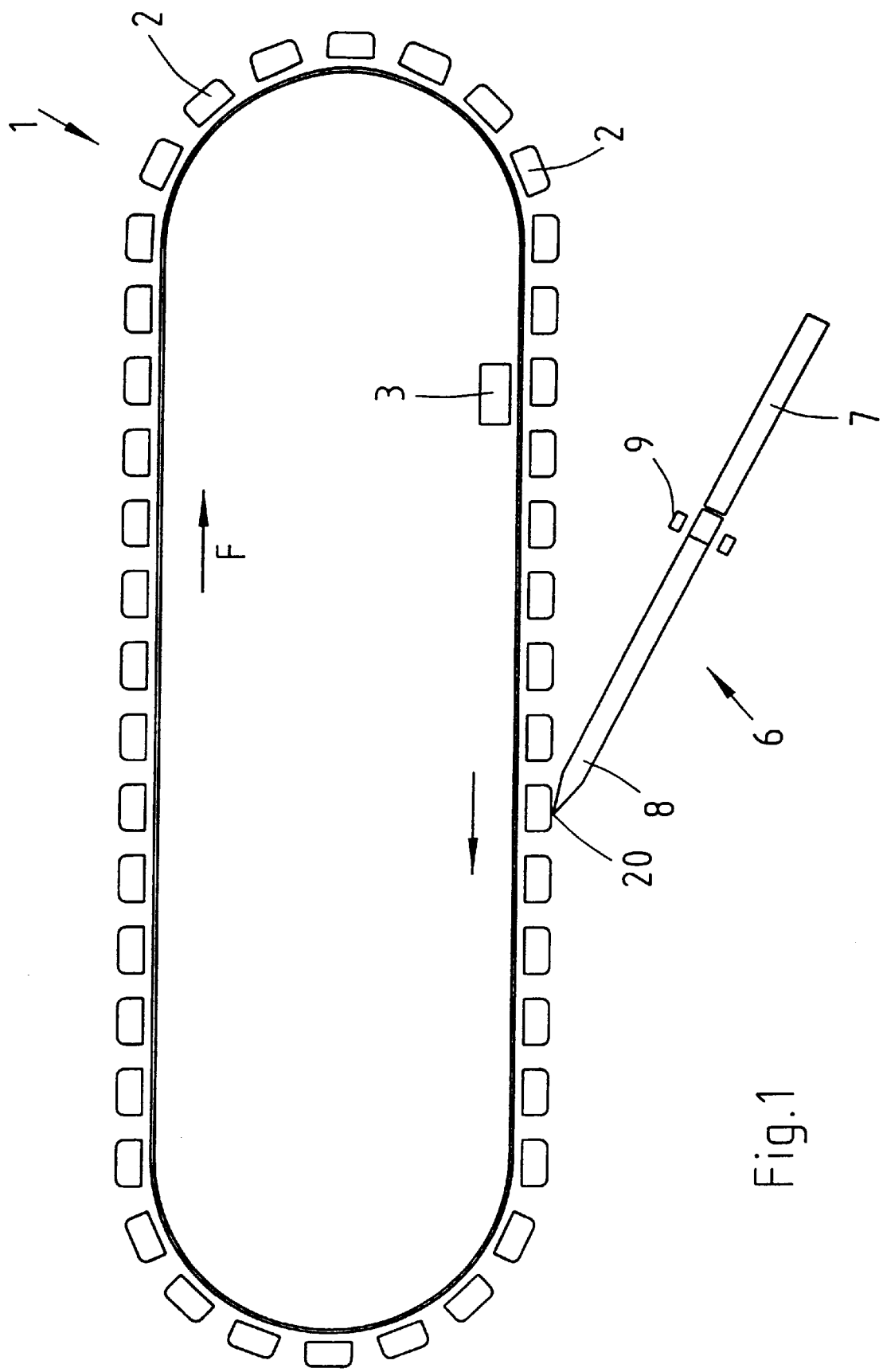
FIG. 1 is a diagrammatic top view of a hanging conveyor system with a transfer place.
Figure 2:
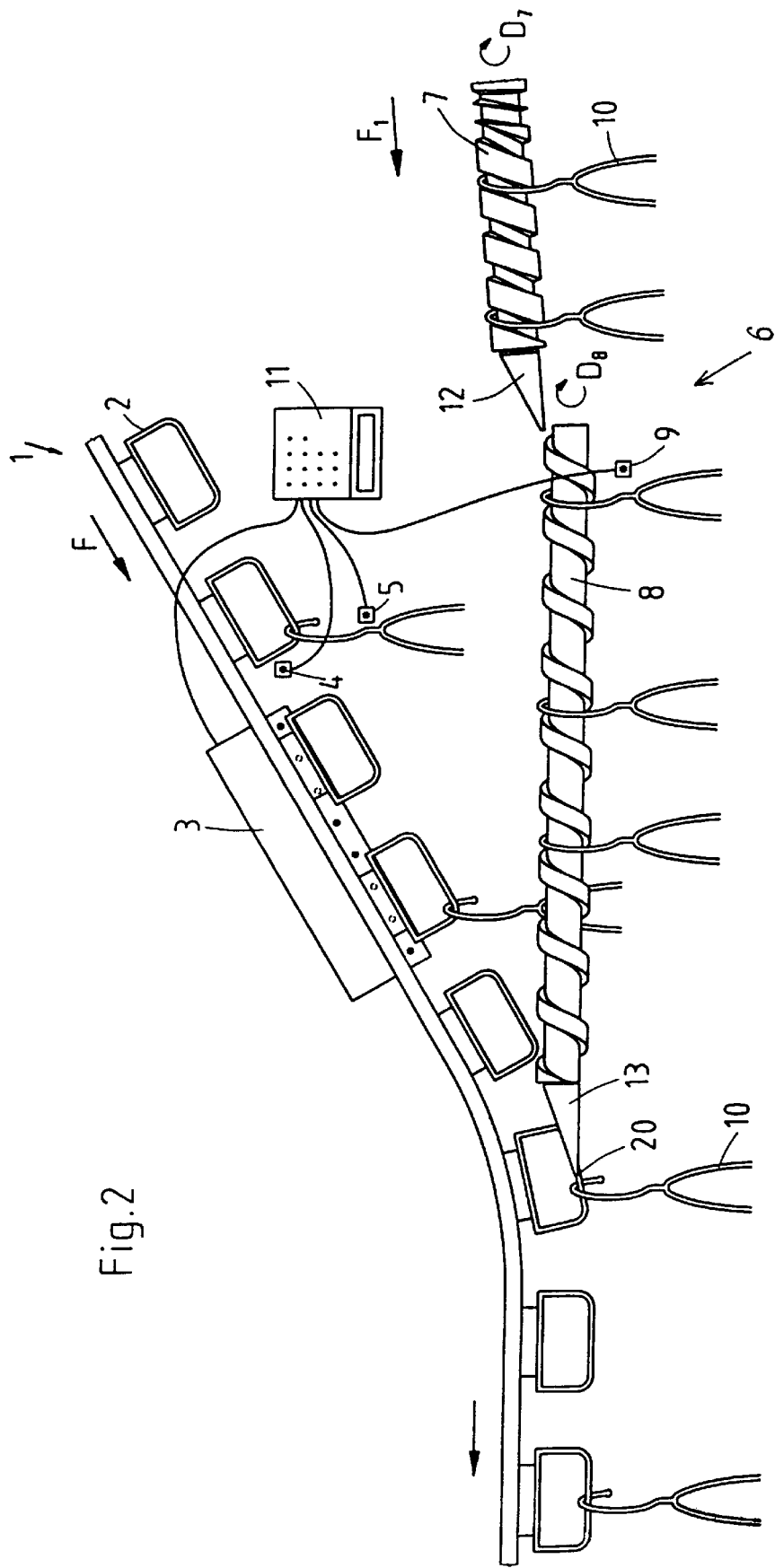
FIG. 2 is a side view of the transfer place in side view.

As shown diagrammatically in FIG. 1, the hanging conveyor system has an endlessly revolving conveyor 1 in which a plurality of conveyor pockets 2 are hung at regular distances apart. Via the feed device 6, the conveying carriers 10 to be sorted are fed into the conveyor 1. In order that the conveying carriers 10 (not shown here) can be sorted, the conveyor 1 is provided with a plurality of delivery places (not shown here) at which the conveying carriers 10 can again be moved out. The conveyor as 1 travels with constant speed in the direction of conveyance F. As seen in FIG. 2, there is provided in the conveyor 1 a measuring device 3 which is operatively connected with the control device 11. There are also connected to the control device 11 the light barriers 4 and 5, which are arranged in the conveyor line of the conveyor 1, and the light barrier 9, which is provided on the feed device 6.

The feed device 6 comprises the individualizing device 7 and the transfer conveyor 8 arranged in front of the individualizing device as seen in the direction of conveyance. Both the individualizing device 7 and the transfer conveyor 8 consist essentially of a driven spindle which can convey the hooks of the conveying carrier 10 without slippage. Both spindles of the individualizing device 7 and transfer conveyor 8 are driven by an electric motor, not shown here for reasons of simplicity. The drive motor of the transfer conveyor 8 is also connected with the control device 11.

In the measurement device 3 there is produced a clock signal by which regularly spaced fixed points of the conveyor 1 are interrogated and detected. For example, the conveyor pocket 2 can be recognized via a light barrier. It is also conceivable to effect an inductive measurement in order to detect defined points which recur regularly in the conveyor. It is important for the timing only that the points are regularly present in the conveyor. Over the length of the measuring device 3, these defined points are detected several times so as correspondingly to increase the clock-pulse rate and thus increase the precision of the measurement. Since the path from the measuring device 3 to the transfer place 20 is fixed, the time which elapses for a given conveyor pocket 2 passing the measuring device 3 to reach the transfer place 20 can be determined precisely in the control device 11. With constant speed of revolution of the conveyor 1, a defined number of clock pulses can therefore be counted until the conveyor pocket reaches the transfer place 20, whereby the time is therefore precisely determined.

In the feed device 6, a minimum spacing is established by the individualizing device 7 between the conveying carriers 10 which arrive at random and each conveying carrier 10 is transferred over the incline 12 after they are individualized to the transfer conveyor 8. The time of transfer of the conveying carrier 10 onto the transfer conveyor 8 is detected by the light barrier 9 and made known to the control device 11. The conveying carriers 10 are then fed by the transfer conveyor 8 to the transfer place 20 where they slide over the incline 13 into a conveyor pocket 2 which is passing the transfer place 20.

Since the drive motor of the transfer conveyor 8 is connected to the control device 11, it can be determined in the control device how long a period of time will pass, with the existing speed of rotation of the spindle, until the conveying carrier 10 detected by the light barrier 9 will reach the transfer place 20. This period of time is compared with the time which will pass until a free conveyor pocket will arrive at the transfer place 20. Depending on the result of this comparison, the control device 11 now adjusts the speed of the drive motor for the transfer conveyor 8 in such a manner that the conveying carrier 10 arrives at the transfer place 20 at the same time as the free conveyor pocket 2.

In order to prevent two conveying carriers 10 being fed into one conveyor pocket 2, it is determined, via the light barrier 5 in the conveyor line of the conveyor 1, whether the conveyor pocket 2 next reaching the measuring device 3 is already occupied by a conveying carrier 10. The result is also transmitted to the control device 11, so that the latter can adjust the transfer conveyor 8 accordingly. The conveyor speed may be reduced so that the occupied conveyor pocket 2 can pass the transfer place 20 and the conveying carrier 10 can be introduced only into the next free conveyor pocket 2.

In order to facilitate the transfer of the conveying carriers 10 into the conveyor pocket 2, the conveyance line of the conveyor 1 passes with a slope to the transfer place 20 and then changes into a horizontal course, as shown in FIG. 2.

Figure 3:
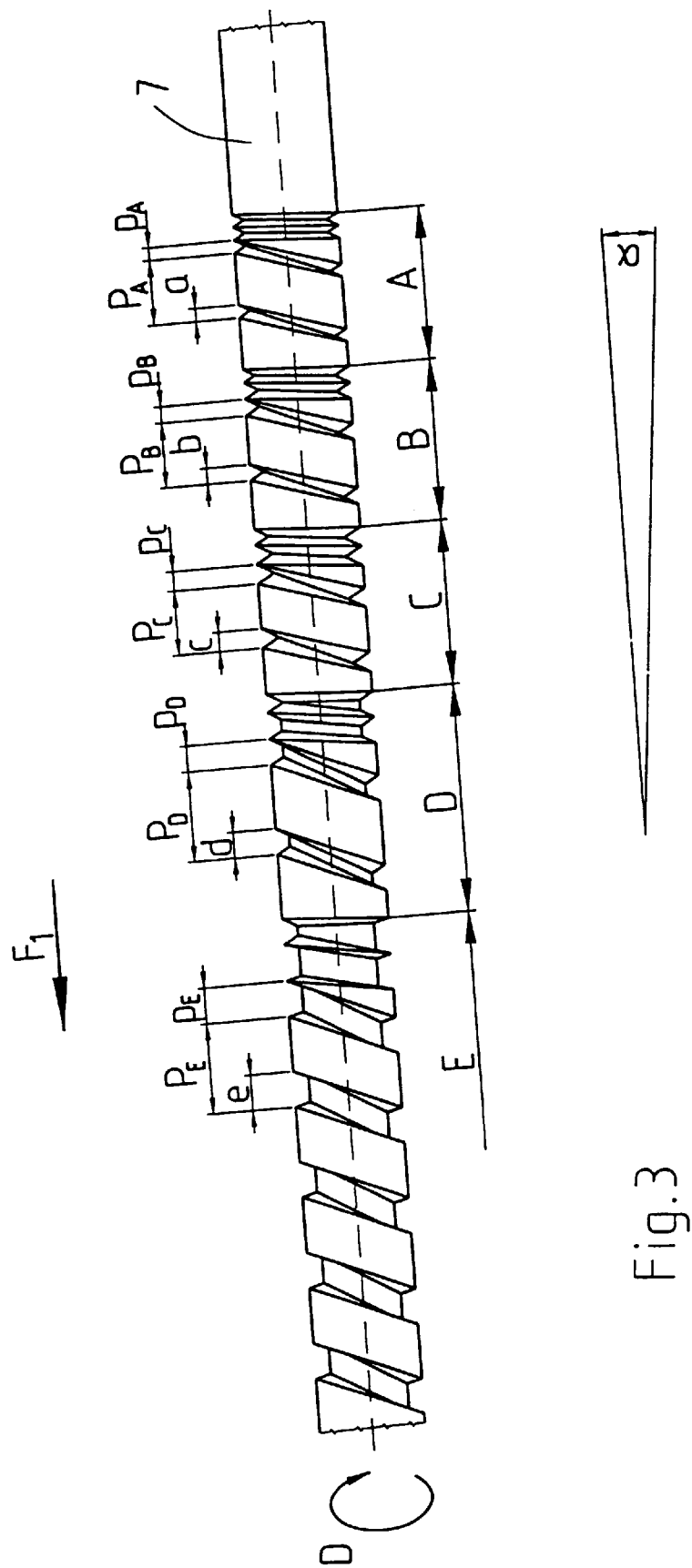
FIG. 3 is a side view of the spindle of the individualizing device of the disclosed embodiment of the invention.

FIG. 3 shows the spindle of the individualizing device 7 shown in the embodiment in FIG. 3, the spindle of the individualizing device 7. As in this embodiment has a single continuous groove. In the direction of conveyance $F_1$ the groove is divided into individual regions A, B, C, D, E. In each region A, B, C, D, E, the groove has two different pitches P, p. Referred to the direction of conveyance $F_1$, the smaller pitch p is followed in each region by the larger pitch P. The width of groove a, b, c, d, e increases in the direction of conveyance $F_1$ also in each region A, B, C, D, E. In each region A, B, C, D, E there are preferably provided two full revolutions of the groove with a small pitch $P_A$, $P_B$, $P_C$, $P_D$, $P_E$ and following this two full revolution with a large pitch $P_A$, $P_B$, $P_C$, $P_D$, $P_E$. The pitch increases in the direction of conveyance $F_1$. In other words, the large pitch $P_A$ in the region A is smaller than the large pitch $P_B$ in the region B. The smaller pitch p also increases in the direction of conveyance $F_1$, so that the small pitch $P_A$ in region A is smaller than the small pitch $P_B$ in region B. The width of groove a in region A corresponds preferably to the smallest cross section of the hook of a conveying carrier 10 to be conveyed. In that way, the smallest conveying carrier 10 which is brought onto the transfer conveyor 8 is picked up directly in region A and must then pass through the groove in the direction of conveyance $F_1$. Hooks of larger cross section cannot drop into the groove at a and are transported by the frictional forces further in the direction of conveyance $F_1$ until they drop into a groove Portion which is suitably large for them.

To assist in the moving away of conveying carriers 10 of larger hook cross section, the spindle of the transfer conveyor 8 is arranged descending in direction of conveyance $F_1$. The angle of inclination α is about 3 to 5 degrees.

Figure 3A:
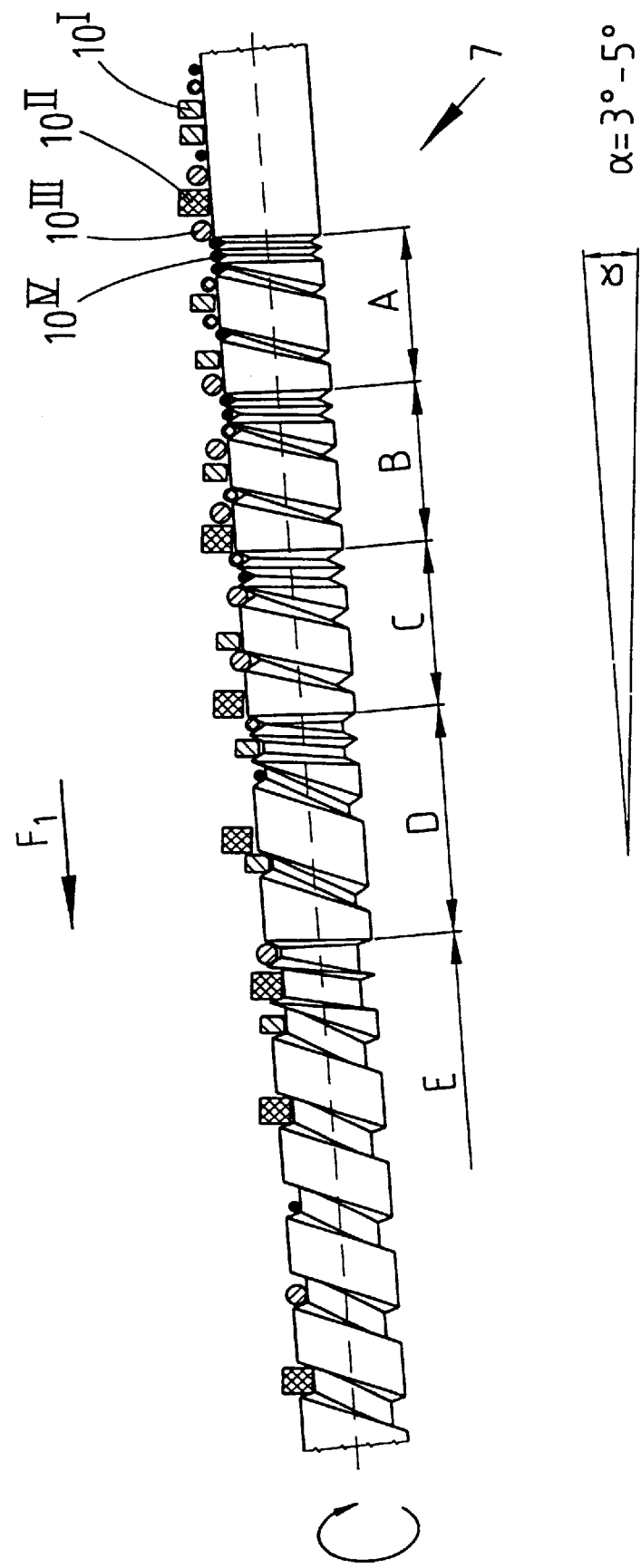
FIG. 3a is a side view of the spindle of the individualizing device of FIG. 3, including a diagrammatic view of conveying carriers of different hook cross section which are arranged thereon.

FIG. 3a shows how conveying carriers 10 of different hook cross sections $10'$, $10''$, $10'''$, $10^{IV}$ are gripped by the groove of the spindle of the individualizing device 7. In the region D it is clear that a conveying carrier 10 of larger hook cross section cannot pass a conveying carrier of smaller cross section.

While the individualizing device 7 has an increasing pitch in the direction of conveyance $F_1$, the spindle of the transfer conveyor 8 is of constant pitch, so as to always have a reproducible course of speed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for the individualizing of conveying carriers comprising:

a rotatably driven spindle, a groove formed in and extending along the spindle in a direction of conveyance along the spindle, wherein the groove has a pitch which generally increases in the direction of conveyance;

the groove is divided into several regions of different pitches along the direction of conveyance, in each groove region there are at least a first and a last different groove portion in the direction of conveyance and having different respective pitches and, as seen in the direction of conveyance, the pitch of the first groove portion in each groove region is smaller than the pitch of the last groove portion in the preceding region along the direction of conveyance;

wherein the groove has a width that increases in the direction of conveyance; and wherein the width of a first groove portion in the groove region upstream along the direction of conveyance corresponds to a smallest cross section of a conveying carrier.

2. A device according to claim 1, characterized by the fact that the smaller pitch of the groove in each region is provided over at least two full revolutions of the spindle.

3. In combination, the individualizing device of claim 1, and a conveying carrier having a smallest cross-sectional width which corresponds to the width of the first groove portion of the spindle.

4. A feed device for feeding conveying carriers into conveyor pockets, in a hanging conveyor system having a revolving hanging conveyor which is provided with a plurality of conveyor pockets arranged one behind the other, the feed device comprising an individualizing device and a transfer conveyor, characterized by the fact that the transfer conveyor is arranged in front of the individualizing device, as seen in the direction of conveyance, the transfer conveyor having a speed of conveyance which is adjustable;

wherein the individualizing device has a rotatably driven spindle and a groove formed in and extending along the spindle in a direction of conveyance along the spindle, wherein the groove has a pitch which generally increases in the direction of conveyance, the groove is divided into several regions of different pitches along the direction of conveyance, in each groove region there are at least a first and a last different groove portion along the direction of conveyance having different respective pitches and, as seen in the direction of conveyance, the pitch of the first groove portion in each groove region is smaller than the pitch of the last groove portion in the preceding region along the direction of conveyance;

and wherein the width of the first groove portion of the spindle corresponds to a smallest cross-section of a conveying carrier.

5. In combination, the feed device of claim 4, and a conveying carrier having a smallest cross-sectional width which corresponds to the width of the first groove portion of the spindle.

6. A feed device for feeding conveying carriers into conveyor pockets, in a hanging conveyor system having a revolving hanging conveyor which is provided with a plurality of conveyor pockets arranged one behind the other, the feed device comprising an individualizing device and a transfer conveyor, characterized by the fact that the transfer conveyor is arranged in front of the individualizing device, as seen in the direction of conveyance, the transfer conveyor having a speed of conveyance which is adjustable;

wherein the individualizing device has a rotatably driven spindle and a groove formed in and extending along the spindle in a direction of conveyance along the spindle, wherein the groove has a pitch which generally increases in the direction of conveyance, the groove is divided into several regions of different pitches along the direction of conveyance, in each groove region there are at least a first and a last different groove portion along the direction of conveyance having different respective pitches and, as seen in the direction of conveyance, the pitch of the first groove portion in each groove region is smaller than the pitch of the last groove portion in the preceding region along the direction of conveyance;

characterized by the fact that the smaller pitch in each region is provided over at least two full revolutions of the spindle;

and wherein the width of the first groove portion of the spindle corresponds to a smallest cross-section of a conveying carrier.

7. In combination, the feed device of claim 6, and a conveying carrier having a smallest cross-sectional width which corresponds to the width of the first groove portion of the spindle.

8. A feed device for feeding conveying carriers into conveyor pockets, in a hanging conveyor system having a revolving hanging conveyor which is provided with a plurality of conveyor pockets arranged one behind the other, the feed device comprising an individualizing device and a transfer conveyor, characterized by the fact that the transfer conveyor is arranged in front of the individualizing device, as seen in the direction of conveyance, the transfer conveyor having a speed of conveyance which is adjustable;

wherein the individualizing device has a rotatably driven spindle and a groove formed in and extending along the spindle in a direction of conveyance along the spindle, wherein the groove has a pitch which generally increases in the direction of conveyance, the groove is divided into several regions of different pitches along the direction of conveyance, in each groove region there are at least a first and a last different groove portion along the direction of conveyance having different respective pitches and, as seen in the direction of conveyance, the pitch of the first groove portion in each groove region is smaller than the pitch of the last groove portion in the preceding region along the direction of conveyance;

characterized by the fact that a width of the groove of the spindle increases in the direction of conveyance;

and wherein the width of the first groove portion of the spindle corresponds to a smallest cross-section of a conveying carrier.

9. In combination, the feed device of claim 8, and a conveying carrier having a smallest cross-sectional width which corresponds to the width of the first groove portion of the spindle.

\* \* \* \* \*